Jan. 6, 1970 V. J. ACQUAVIVA 3,488,448
INCOMING REGISTER CIRCUIT ARRANGEMENT FOR DETECTING CONTINUED DIALING AFTER REGISTER TIME-OUT
Filed Aug 2, 1966 9 Sheets-Sheet 1

INVENTOR
V. J. ACQUAVIVA
BY
J. A. McCorkendale
ATTORNEY

United States Patent Office 3,488,448

Patented Jan. 6, 1970

3,488,448

INCOMING REGISTER CIRCUIT ARRANGEMENT FOR DETECTING CONTINUED DIALING AFTER REGISTER TIME-OUT

Vito J. Acquaviva, Jackson, N.J., assignor to Bell Telephone Laboratories, Incorporated, Murray Hill, N.J., a corporation of New York Filed Aug. 2, 1966, Ser. No. 569,624

Int. Cl. H04m *3/00*

U.S. Cl. 179—18 10 Claims

ABSTRACT OF THE DISCLOSURE

The centralized automatic message accounting incoming register used in automatic telephone switching systems detects a calling customer's 4th, 5th and 6th dialed digits in the D, E, and F storage locations and activates a critical timing interval after the sixth digit in order to determine if the call is to be recorded as a request for directory assistance. The receipt of digits other than those associated with directory assistance will activate the critical timing interval after the registration of the seventh digit and allow the register to record either a 7 or 10 digit call. The dialing of a subsequent digit following the critical timing interval will transmit reorder tone to the calling customer and prevent the call from being completed as recorded.

This invention relates to an automatic telephone switching system and particularly to an incoming register circuit for use in such system.

During completion of a telephone call over many types of present day systems, for example, the step-by-step CAMA system, the impulses as dialed by the customer are received and stored in an incoming register circuit until dialing of the number has been completed, following which the register assumes a "registration complete" condition and proceeds to outpulse the stored information to the sender. Obviously the register circuit should promptly recognize when the complete number has been dialed so that the registration complete condition can be assumed and the stored information outpulsed without undue delay.

In accordance with modern telephone switching procedures various different types of impulse groups may be dialed by the calling customer and received by the register circuit. For example, the call may be of the "NXX+411" type where NXX represents the area code and 411 represents a present standard code for information calls. Again, it may be of the "NXX+411X" type where NXX represents the office code and 411X represents the station code. Still further, the call may be of the 10-digit type where the first three digits represent the area code, the second three digits represent the office code and the last four digits represent the station code. It is necessary, of course, that the incoming register be able to distinguish between these various types of calls in order that the registration complete condition may be assumed at the proper time without delay.

In accordance with earlier practice the register was able to distinguish between area codes and office codes by examining the middle digit of the 3-digit code, since for area codes the middle digit was required to be either "0" or "1." However, in accordance with a recently introduced numbering plan, which substantially increases the number of office and area codes theoretically feasible, office codes and area codes are interchangeable and can no longer be distinguished simply by examining the middle digit. This presents a new problem to the register circuit.

In accordance with the usual current practice in the instance, for example, of the step-by-step CAMA system, the three digits of the called code are passed by the incoming register to a pretranslator which translates the digits into an office code, an area code or an interchangeable office and area code. For the first two codes, the pretranslator returns to the register an "office code" mark or an "area code" mark respectively. The office code mark primes the register to await seven digits before adjusting to "registration complete" condition while the area code mark primes the register to await either six or ten digits. In the instance of an interchangeable office and area code, however, the pretranslator returns an "interchangeable" code mark to the register which serves as an indication that the register, itself, must determine the number of digits to expect. In order that the register may perform this function, it is arranged to use a digit timing method to determine the apparent end of dialing. This preferably includes a temporary reduction of the interdigital timing interval from its normal 16–25 seconds interval to a "critical" timing interval of 3–5 seconds. It has been determined through extensive observation that, if a called number is being dialed normally, the reduced timing interval of 3–5 seconds is adequate and will not result in any "lost" digits. Reduction of the interval at this point in the call results in a desirable reduction in the necessary additional holding time of the register as compared with the additional holding time that would be involved if the normal interval of 16–25 seconds were retained. Obviously, the additional register holding time which necessarily results from the digit timing at this point should be kept as low as possible without resulting in lost digits during normal dialing. It is recognized, however, that if a calling customer happens to be late with a particular digit, i.e., if he pauses between digits for an interval greater than the "critical" reduced interval established for the incoming register during the digit timing, an incorrectly terminated connection will result.

Accordingly, it is an object of the present invention to improve the operation of incoming register circuits.

Another object of the invention is to prevent undesired call terminations from resulting due to register time-out before the dialing of the call has been completed.

A still further object of the invention is to return a reorder indication to the calling customer when the dialed number has not been completely stored in the register circuit prior to register time-out.

In accordance with a specific embodiment of the invention the line pulse repeating relay of the incoming register is held on the line through transfer contacts of the time-out relay which operates just prior to operation of the registration complete relay. This permits the line pulse repeating relay to monitor the line for possible additional digits after time-out of the register. In the event additional pulses are received they are repeated by the line relay, and the pulse counting relays operate in the usual manner under control of the line relay. A make contact of the first counting relay to operate and a make contact of the time-out relay are included as series elements in the operate path of the trouble release relay whereby to operate this relay if additional pulses are received on the line after register time-out. Operation of the trouble release relay results in its usual function of preventing the call from being terminated as registered and of transmitting reorder tone to the calling customer.

A feature of my invention includes circuitry for detecting the completion of registration of dialed digits in a pulse register circuit and circuitry for detecting the receipt of an additional pulse and for thereupon preventing completion of the call in accordance with the digits registered in the register circuit.

Another feature of my invention is circuitry for operating the line pulse repeating relay on receipt of an additional pulse after the normal circuitry has opened the path to the pulse repeating relay upon detection of an apparent complete registration.

A still further feature of my invention is circuitry for changing the time interval of the register time-out circuit for certain critical digit combinations and digit intervals which might indicate that the last digit has been dialed. Specifically in accordance with this feature of my invention the time-out interval of the timing circuit is changed from the normal interdigital time interval to a considerably shorter interval.

Another feature of the invention is means responsive to additional dialing after register time-out for transmitting a recorder signal to the calling customer.

A full understanding of the arrangement contemplated by the present invention as well as an appreciation of the various advantageous features thereof may be gained from consideration of the following detailed description in connection with the accompanying drawings, in which.

GENERAL DESCRIPTION

Figure 1:
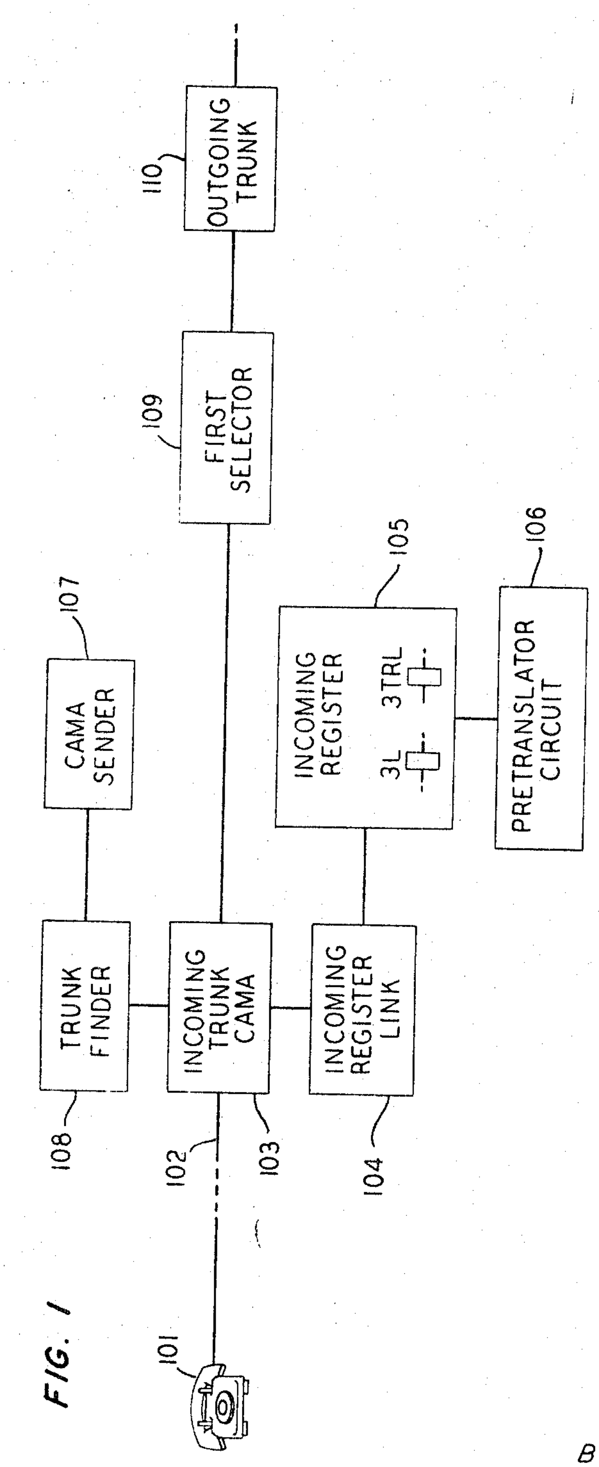
FIG. 1 shows schematically one way in which the incoming register circuit contemplated by the present invention may be associated with other portions of an automatic telephone system.
Figure 10:
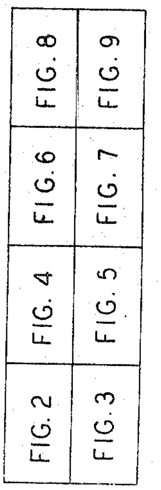
FIG. 10 indicates the manner in which FIGS. 2 to 9 of the drawing should be arranged to show the specific illustrative embodiment of the invention.
Figure 2:
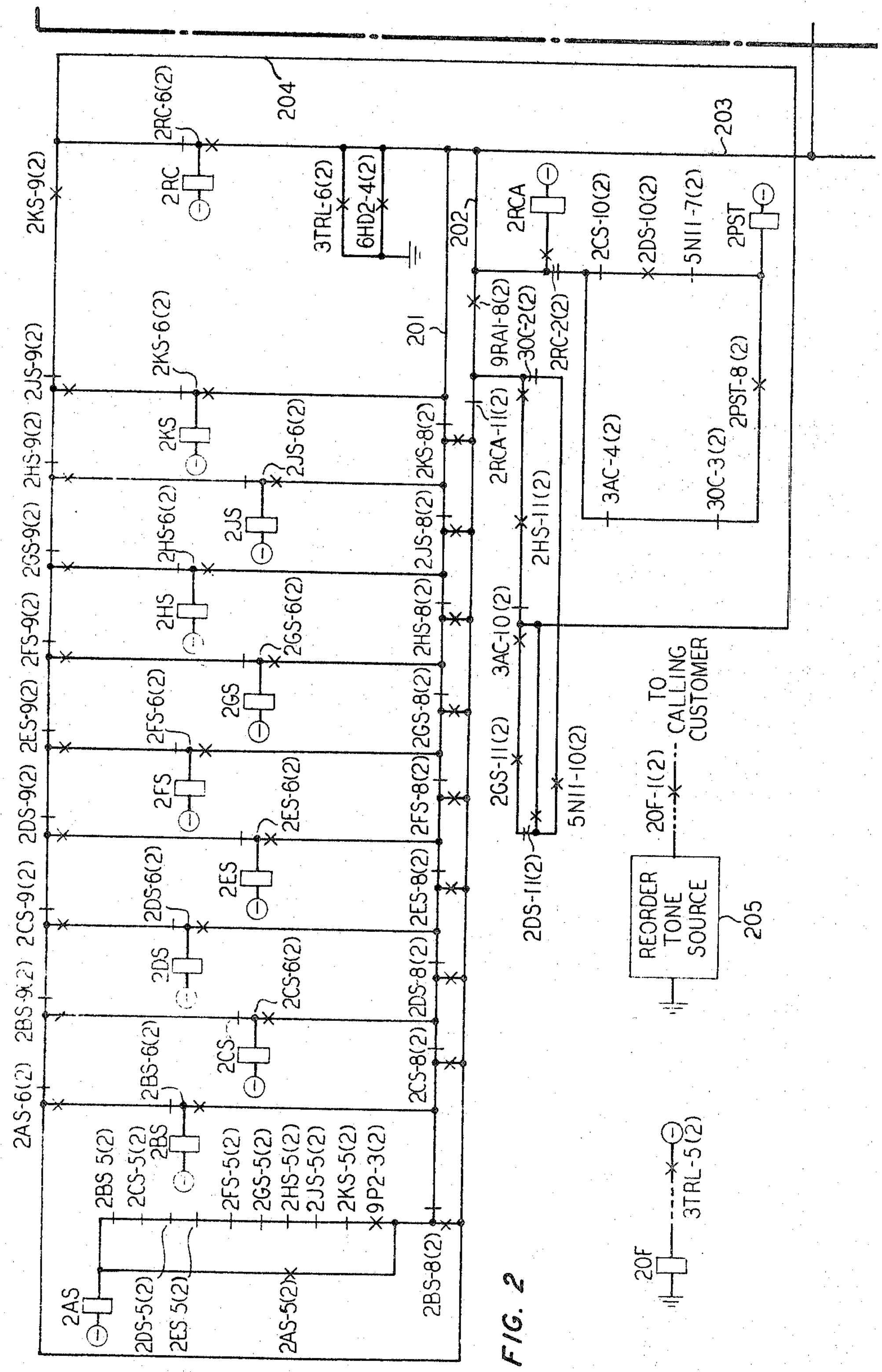
FIG. 2 shows particularly the input digit steering circuit of one specific illustrative embodiment of the input register contemplated by the invention.

The arrangement and operation of the various components of the illustrative embodiment of the invention will be described in detail subsequently with reference to FIGS. 2 to 9 of the drawing. However, in order to first gain a general overall understanding of the arrangement contemplated, a brief general description will be given at this point with particular reference to FIG. 1. Referring, therefore, to FIGURE 1 there is shown in highly schematic form a portion of the automatic telephone switching equipment provided at an intertoll dialing office of a step-by-step CAMA system. (The centralized automatic message accounting system is commonly referred to as the CAMA system.) This showing is for illustrative purposes only as one embodiment in connection with which the incoming register circuit of the present invention may be used.

Telephone set 101 may be connected through a distant office or through a local office selector of the CAMA office via line 102 to incoming trunk 103 and in turn through incoming register link 104 to incoming register 105. Pretranslator circuit 106 is also connected to register 105.

In a manner which will be described in detail subsequently, incoming register 105 receives and stores the digits of the called number as dialed by the customer at telephone set 101, and after the dialing has been completed the digits are outpulsed to CAMA sender 107 which has been connected to incoming trunk 103 through trunk finder 108. The pulses are subsequently transmitted to the called office in the usual manner through selectors, as first selector 109, and outgoing trunk 110.

It will be assumed that the new numbering plan referred to above is being used, and it will be recalled that, since this involves the use of interchangeable office and area codes, the total number of digits to be expected by the incoming register 105 cannot be determined by the previously followed method which involved examining the second digit of the called number. Accordingly, pretranslator circuit 106 is provided which accepts from incoming register 105 the three digits of the called code and translates them into an "office," "area" or "interchangeable office and area" code.

Receipt of the office code mark primes incoming register 105 to await seven digits before assuming the registration complete condition, while receipt of the area code mark primes register 105 to await either six or ten digits. Receipt of the interchangeable code mark, however, indicates to register 105 that the register, itself, must determine the number of digits to expect.

In order that register 105 may make the above determination it is arranged, as will be described in detail subsequently with reference to FIGS. 2 to 9, to use a digit timing method. The interdigital timing interval of 16–25 seconds, normal for registers of this general nature, is temporarily reduced to a critical timing interval of 3–5 seconds after a particular interval, the critical interval being activated under two conditions:

(1) After the sixth digit, with digits 411 registered in the fourth, fifth and sixth storage positions, whereby to determine if the call is an NXX+411 or NXX+411X call;

(2) After the seventh digit, with other than 411 registered in the fourth, fifth and sixth storage positions, whereby to determine if the call is a 1-digit or a 10-digit call.

As pointed out above, reduction of the timing interval at this critical point in the call results in a marked reduction in the necessary additional holding time of the register as compared with the additional holding time that would be involved if the normal interdigital interval were retained.

In instance (1) above if a seventh digit is not received over line 102 before expiration of the critical interval, register 105 might assume a 6-digit call is involved, and in instance (2) if an eighth digit is not received before expiration of the critical interval it might assume that a 7-digit call is involved; in either event on such assumption the register would adjust to a registration complete condition and proceed to outpulse the registered pulses to sender 107. However, it may well happen that the calling customer in one of the above instances will be late in dialing one of the digits; for example in instance (1) he might pause for some reason after dialing the sixth digit and not resume dialing and actually transmit the seventh digit until expiration of the critical interval and assumption of the registration complete condition by register 105. In such event the customer would, of course, receive an unwanted termination of his call since the seventh digit would be "lost" and the call would be terminated on the basis of the six digits transmitted before register 105 adjusted to the registration complete condition.

In order to prevent incorrect call terminations of the above-referred-to nature register 105 includes my novel circuit arrangement, which will be described in detail subsequently, whereby the line impulse repeating relay is maintained in monitoring relationship with line 102 after register 105 has assumed the registration complete condition. In the event of late pulsing, this arrangement is effective, in a manner described in detail subsequently, to prevent termination of the call as registered and to transmit a reorder tone to the calling customer. The calling customer is, therefore, spared the annoyance and expense of an improperly terminated call; since he feels he has dialed the correct number, obtaining a wrong termination is particularly frustrating to the customer and almost certain to be looked upon as resulting from improperly operating equipment.

As will be clear from the subsequent detailed description the circuit arrangement referred to in the preceding paragraph includes the line impulse repeating relay (3L) and the trouble release relay (3TRL).

DETAILED DESCRIPTION

A more detailed description of the contemplated arrangement will now be given, reference being made particularly to FIGS. 2 to 9. The circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding or the like is preceded by a numeral indicating the figure of the drawing in which the apparatus appears, for example, the winding of relay 2AS appearing in FIG. 2 and the winding of relay 9RA appearing in FIG. 9. Further, each contact designation is followed by a numeral in parenthesis which indicates the figure of the drawing in which the contact appears, for example, the designation "2AS–8(5)" indicates that contact No. 8 of relay 2AS appears in FIG. 5 while the relay winding, as pointed out above, appears in FIG. 2. In accord with usual circuit design, transfer contact pairs may be either Early Make-Break (continuity) or Early Break-Make (sequence transfer) as dictated by the particular circuit operational requirements.

A, B, C CODE DIGITS REGISTERED BEFORE PRETRANSLATION

After incoming register 105 has been seized in the usual manner through the incoming register link 104 and the hold magnets, as 6HD1 and 6HD2, and the hold-magnet-operated relay 6HD0 have operated, relay 6DCK operates to check for possible double connections at the crosspoints, the link 104 in this embodiment advantageously comprising a crossbar switch. (The complete circuit paths for these operations are not shown since the operations are routine and not of particular interest in the present connection.) Pulsing of the called number is now repeated over the R lead from the trunk and link through the break contacts of respective transfer pairs 2RC–5(3) and 3T0–6(3) to the upper winding of line pulse repeating relay 3L.

Relay 3L operates in step with the pulses as received and, when operated, closes at the make contact of its transfer pair 3L–4(3) a path for applying potential from capacitor 302 to the lower winding of the relay whereby to hold the relay operated long enough even on a short pulse on line R to allow the counting relays to function. The pulses of each dialed digit, as indicated by the release and reoperation of relay 3L, are counted on relays 9P1 to 9P5. (It will be noted that make and break contacts of relay 3L are included in the operate paths of these relays.) Relays 9P1 and 9P2 are wired as a pulse divider, and contacts of these relays control relays 9P3, 9P4 and 9P5. These relays lock as required under control of relays 9RA and 9RA1 to ground at make contact 6HD2–12(9), and a distinct combination of the five counting relays remains operated at the end of each digit. Register advance relay 9RA is a fast-operate, slow-release relay which operates at the start of each digit to provide a locking path for the counting relays and releases at the end of the digit to transfer the count from the counting relays to the respective digit register. Relay 9RA1 operates whenever relay 9RA is released between digits and releases when 9RA is operated during the digit.

Contacts of digit insteering relays 2AS to 2JS steer the digit registration, temporarily stored in the contacts of the counting relays 9P–, to the proper digit register. The K (tenth) digit remains locked in the counting relays. Relay 2AS operates, after the first pulse is received and relay 9P2 operates, over a path from ground at make contact 6HD2–4(2), lead 201, break contacts of respective intervening transfer pairs of input steering relays, make contact 9P2–3(2), intervening break contacts of steering relays, winding of relay 2AS to battery; relay 2AS, operated, locks to the same ground through its make contact 2AS–5(2).

When relay 9RA1 operates at the end of inpulsing the first digit, steering relay 2BS operates from ground, make contact 6HD2–4(2), lead 202, make contact 9RA1–8(2), break contact 2RCA–11(2), make contact of transfer pair 2AS–6(2), break contact of transfer pair 2BS–6(2), winding of relay 2BS to battery; relay 2BS, operates and locks through the make contact of its transfer pair 2BS–6(2) over lead 201 to the ground at make contact 6HD2–4(2). Also, relay 2BS upon operating transfers the holding path for relay 2AS through the make contact of transfer pair 2BS–8(2) to lead 202 whereby to place relay 2AS under control of relay 9RA1. Accordingly, when relay 9RA1 releases during inpulsing of the second digit, relay 2AS will release.

The other relays of the digit insteering chain operate and release in a manner similar to that described with reference to relays 2AS and 2BS. The operation of relay 2RC will be described subsequently.

When the last pulse of the first digit is received the number of pulses in this digit has been registered on contacts of the counting relays, 9P1–9P5, in the manner just described. When relay 9RA releases, but before relay 9RA1 operates, paths are closed to operate two of five relays in the A digit register (8A0–8A7) through break contacts of the 9RA and 9RA1 relays and through contacts of the 9P– counting relays (these respective contacts being included in the contact matrix shown on FIG. 9) and through the make contacts of respective transfer pairs of relay 2AS, as, for example, transfer pairs 2AS–1(8) and 2AS–7(8). The particular two of the A-register relays which operate lock through their respective make contacts, as 8A0–1(8), 8A7–1(8), to ground at make contact 6HD1–10(8) through the break contact of transfer pair 2PST–12(8) and over lead 801. Subsequent operation of relay 9RA1 opens the 0–7 leads via cable 901 and also restores the counting relays 9P1–9P5 to normal position.

Operation of relay 9RA1 following the impulsing of the first digit causes operation of steering relay 2BS as described above. Relay 2BS, operated, connects ground through its make contact 2BS–10(5) to the readout contacts [8A0–2(5), 8A7–2(5)] of the A digit register and operates on a two-out-of-five basis recapture relays 5RC0–5RC7 according to the 8A0–8A7 relays which are operated. For example, assuming relays 8A0 and 8A7 to be operated, recapture relay 5RC0 will operate from ground, make contacts 2BS–10(5), 8A0–2(5), 2AS–8(5), make contact of transfer pair 4AS0–1(5), winding of relay 5RC0 to battery, and recapture relay 5RC7 will operate from ground, make contacts 2BS–10(5), 8A7–2(5), 2AS–12(5), the make contact of transfer pair 4AS0–5(5), winding of relay 5RC7 to battery. Relay 5RC0 upon operating locks to ground through its make contact 5RC0–2(5) and relay 5RC7, upon operating, locks to ground through its make contact 5RC7–2(5). [Relay 4AS0 operated following operation of relay 9P1 from ground at make contact 6HD2–4(2), leads 203, 401 and 402, make contacts 4KP–7(4) and 9P1–1(4), break contact of transfer pair 4AS0–6(4), winding of relay 4AS0 to battery, and, upon operating, locked to the same ground through the make contact of its transfer pair 4AS0–6(4) and lead 403.]

The registration of the first digit in the A register as indicated by operation of two relays of the 8A0–8A7 group is therefore transferred to the recapture relay group by operation of the corresponding relays of the 5RC0–5RC7 group. Release of the 2AS relay at the start of inpulsing of the second digit disconnects the A digit register from the recapture relays. After inpulsing of the fourth digit and operation of relay 2ES, the A digit register is released, through interruption of the ground path at break contact 2ES–12(8), and may be used subsequently to register the ninth digit.

Registration of the B through H digits proceeds in the same manner as that described above in connection with the A digit except that the registers remain locked to ground and do not transfer their registration to the recapture relays until outpulsing takes place. The ninth digit is registered in the A digit register (released as previously described) and the tenth digit is not transferred into a digit register but remains locked in contacts of the counting relays 9P1–9P5.

PRETRANSLATION INDICATION OBTAINED AFTER THIRD DIGIT

As pointed out above the first three digits of the called number are accepted from the incoming register 105 by pretranslator 106 which translates them into one of three codes, "office," "area" or "interchangeable office and area."

Pretranslator circuit 106 is not shown in detail herein since the specific circuit arrangement is not particularly pertinent in the present connection; it may be in accordance with any one of several types of translator circuits well known in the art.

After registration of the third digit, relay 2PST operates from ground at make contact 6HD2–4(2), lead 202, break contact of transfer pair 2RC–2(2), break contact 2CS–10(2), make contact 2DS–10(2), break contact 5N11–7(2), winding of relay 2PST to battery; relay 2PST operates and locks to this same ground through its make contact 2PST–8(2) and break contacts 3OC–3(2) and 3AC–4(2). Relay 2PST, operated, applies resistance battery to its associated lead PST (FIG. 3) through resistor 303 make contact of transfer pair 6HD0–10(3), break contact 3IC–11(3), and make contact 2PST–9(3); this signal on lead PST is effective to seize the associated pretranslator 106.

Figure 3:
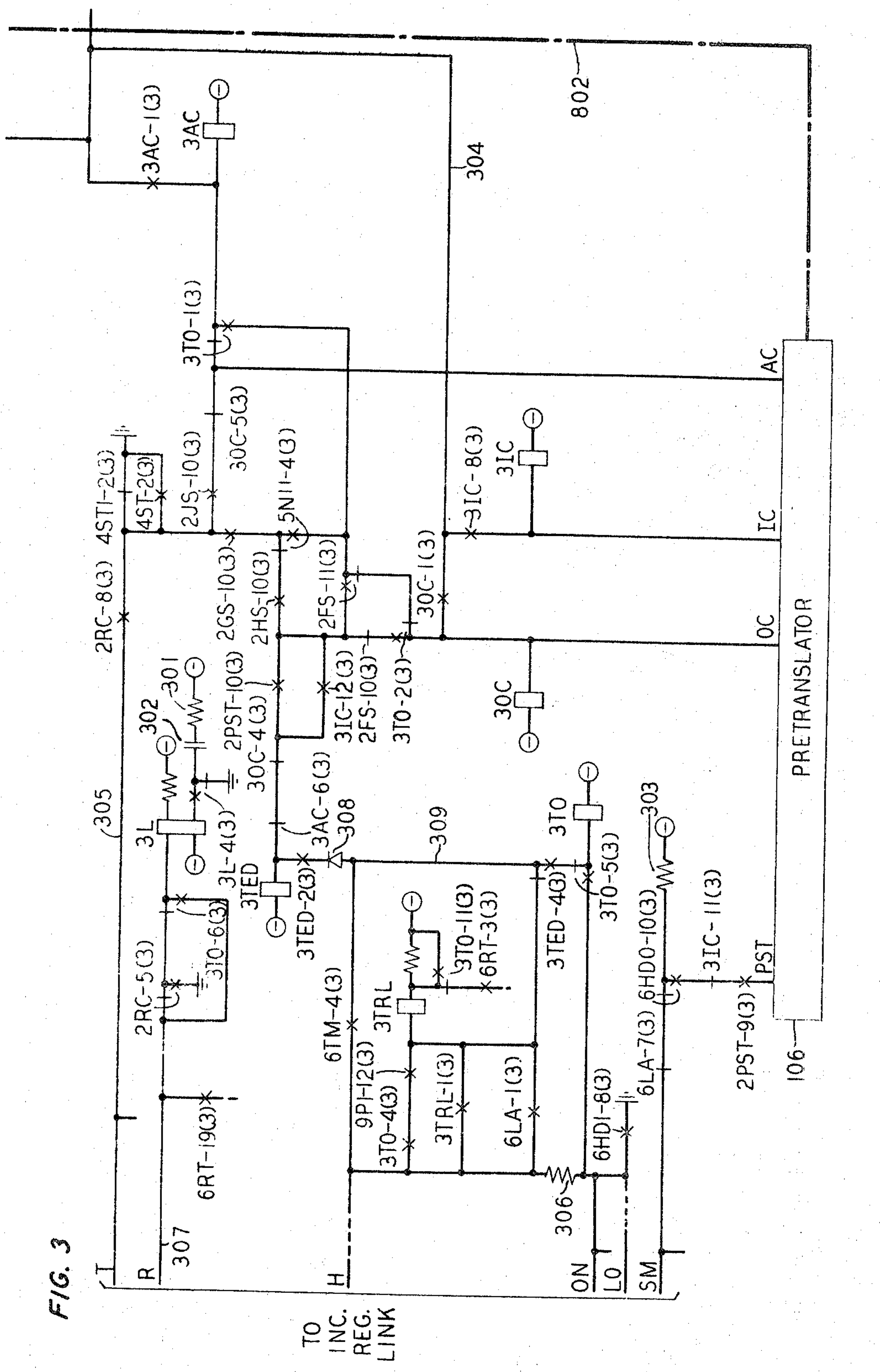
FIG. 3 shows particularly the relays of the register which operate on indications from the pretranslator as well as the line pulse repeating and time-out relays.
Figure 4:
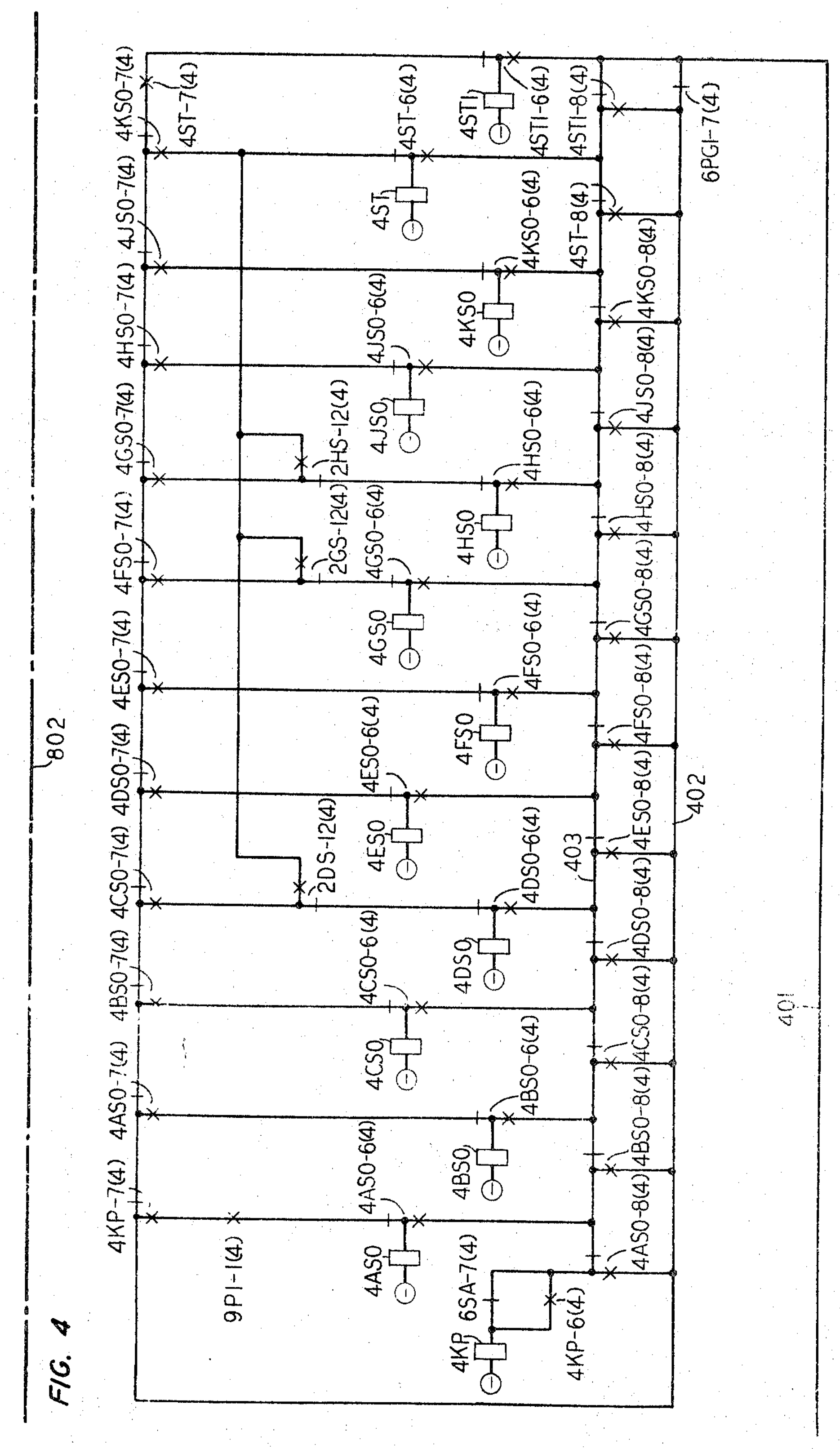
FIG. 4 shows particularly the output digit steering circuit.
Figure 5:
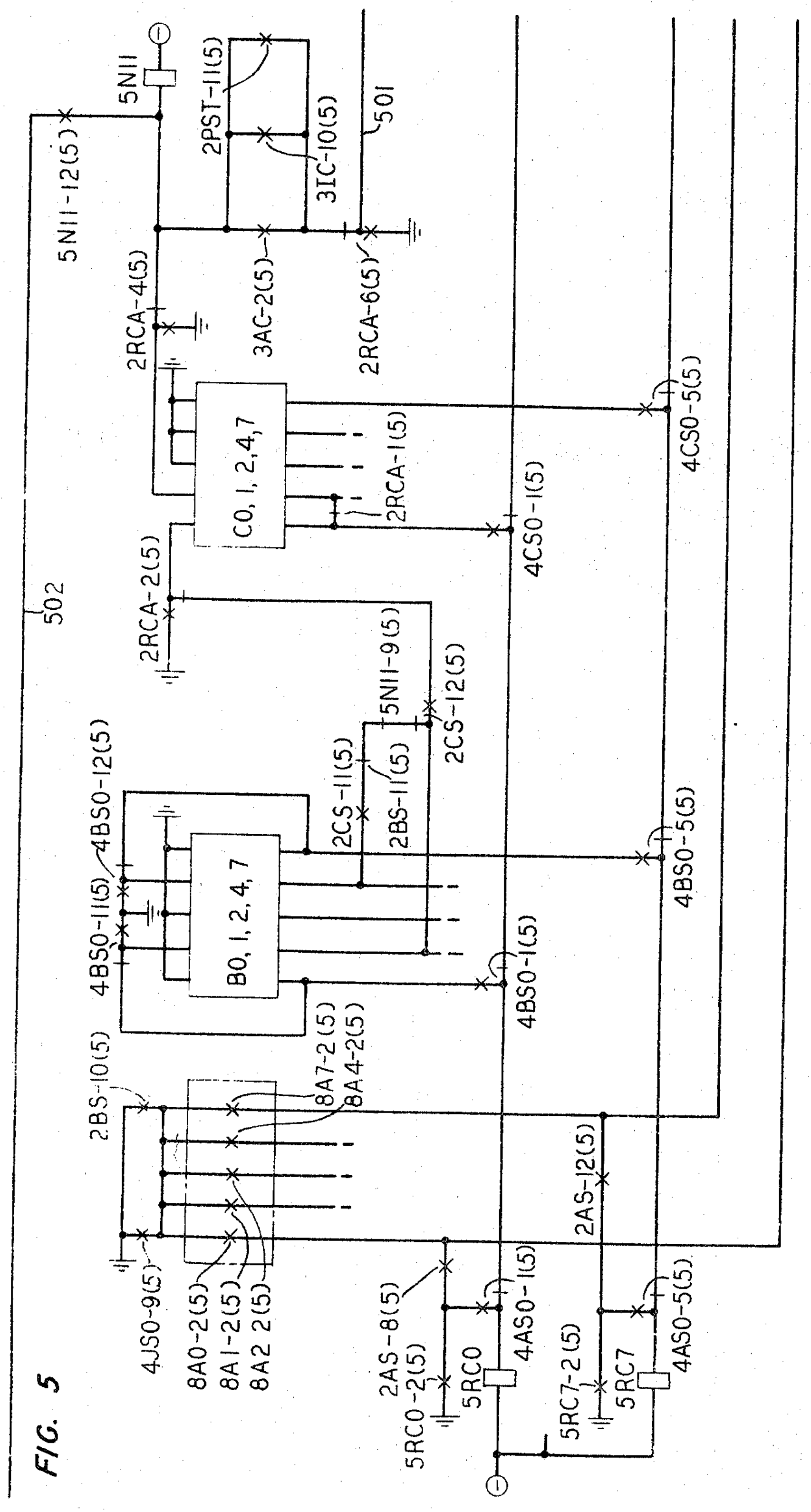
FIG. 5 shows a portion of the digit recapture circuit.
Figure 6:
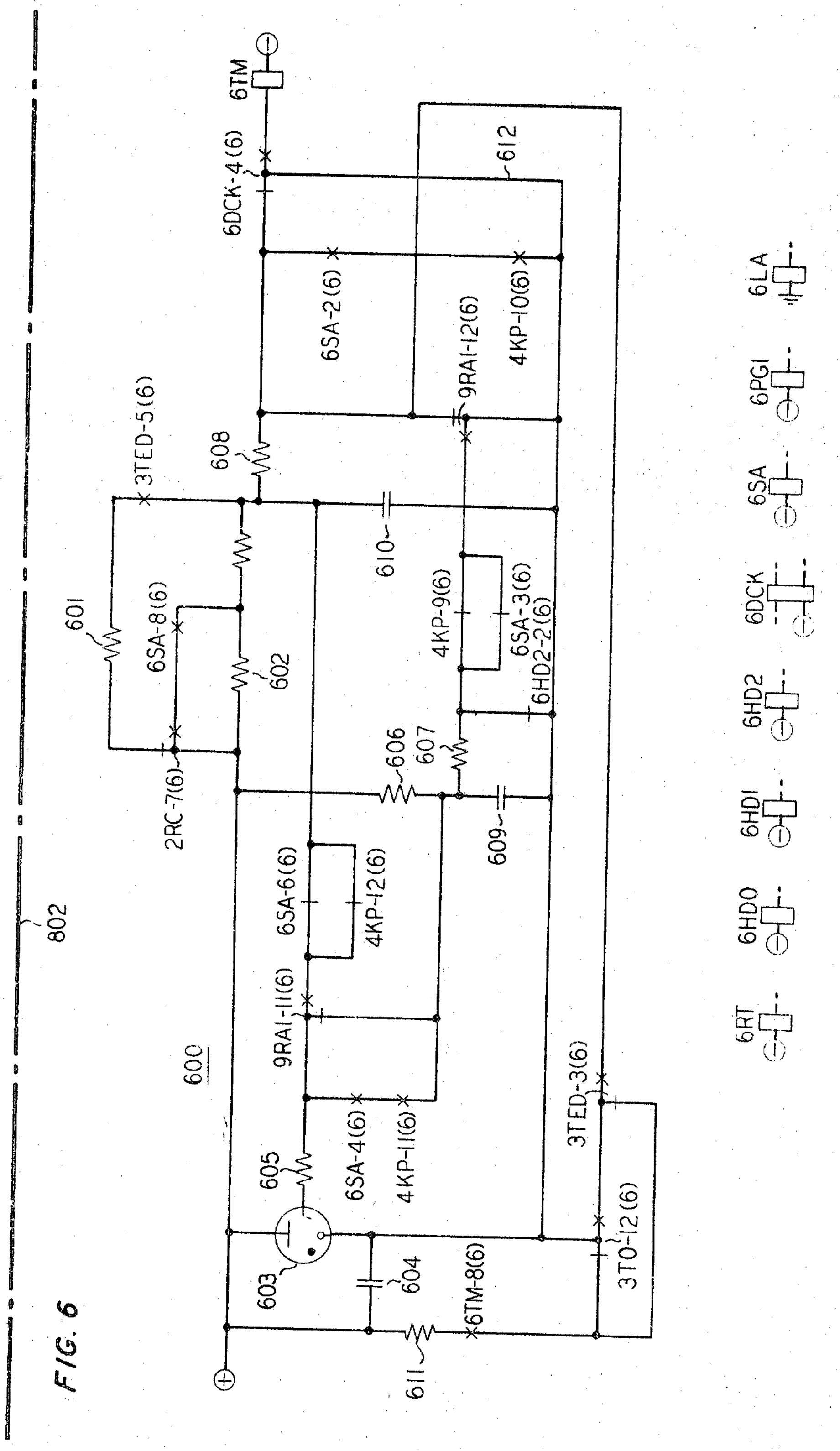
FIG. 6 shows particularly the function timer circuit.
Figure 7:
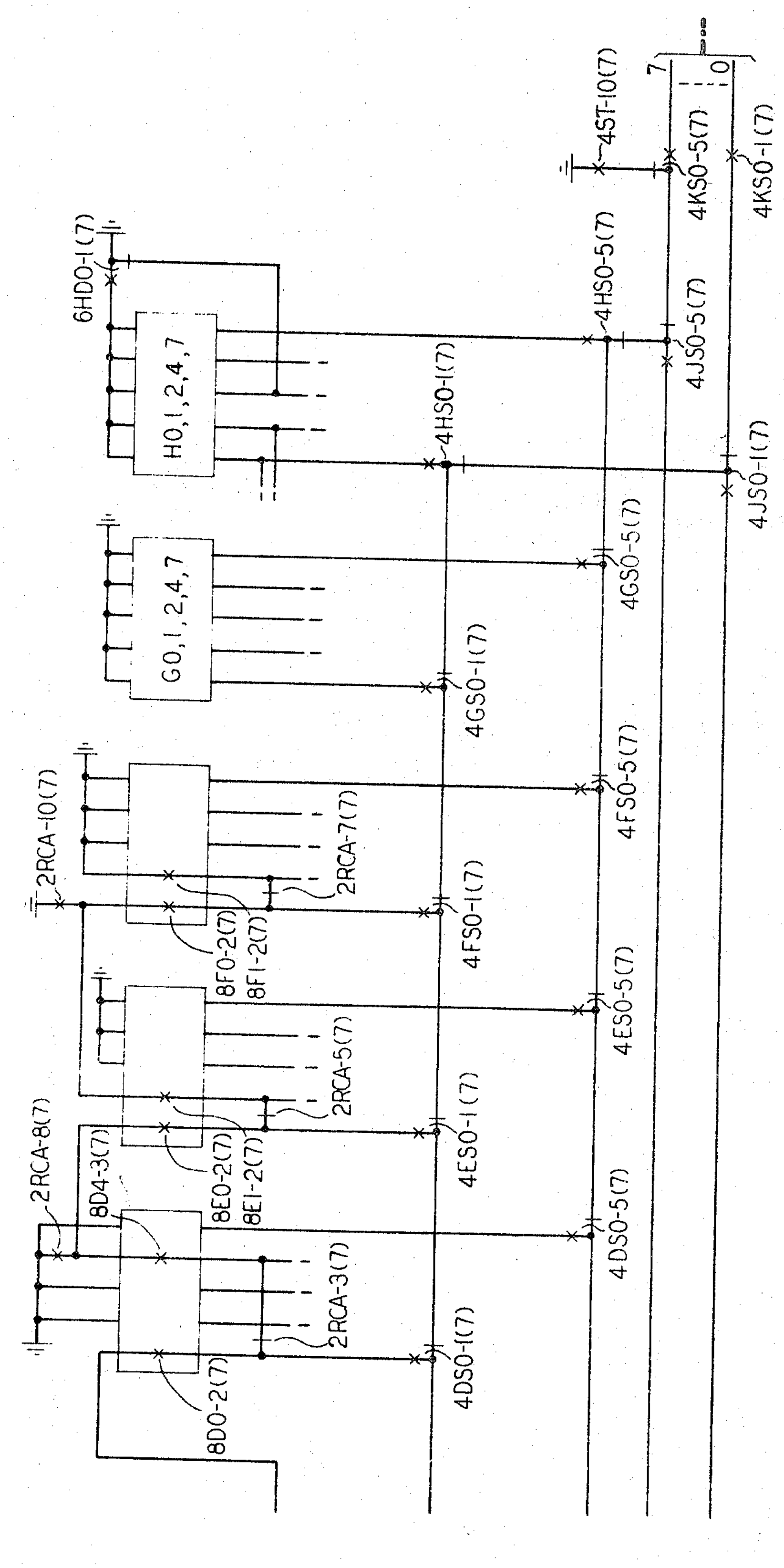
FIG. 7 shows another portion of the digit recapture circuit.

When the pretranslator has been seized, the A, B and C code digits are transmitted from the corresponding digit registers over leads A0–A7; B0–B7; C0–C7 (FIG. 8) through cable 802 to the pretranslator for code translation. The pretranslator translates the three code digits into one of three codes, "area" which is transmittted back over lead AC (FIG. 3); "office" which is transmitted back over lead OC; and "interchangeable office and area" which is transmitted back over lead IC. Since the present invention is concerned primarily with the third situation, the effect of the first two code indications will not be described other than to point out that receipt of the "office" indication on lead OC is effective to cause operation of relay 3OC and that receipt of the "area" indication on lead AC is effective to cause operation of relay 3AC. Operation of relay 3OC conditions the register to expect seven digits and operation of relay 3AC conditions the register to expect six or ten digits.

As pointed out above, receipt of the "interchangeable" code by the register indicates that the register, itself, must determine the number of digits to expect.

"INTERCHANGEABLE" INDICATION FROM PRETRANSLATOR

Figure 8:
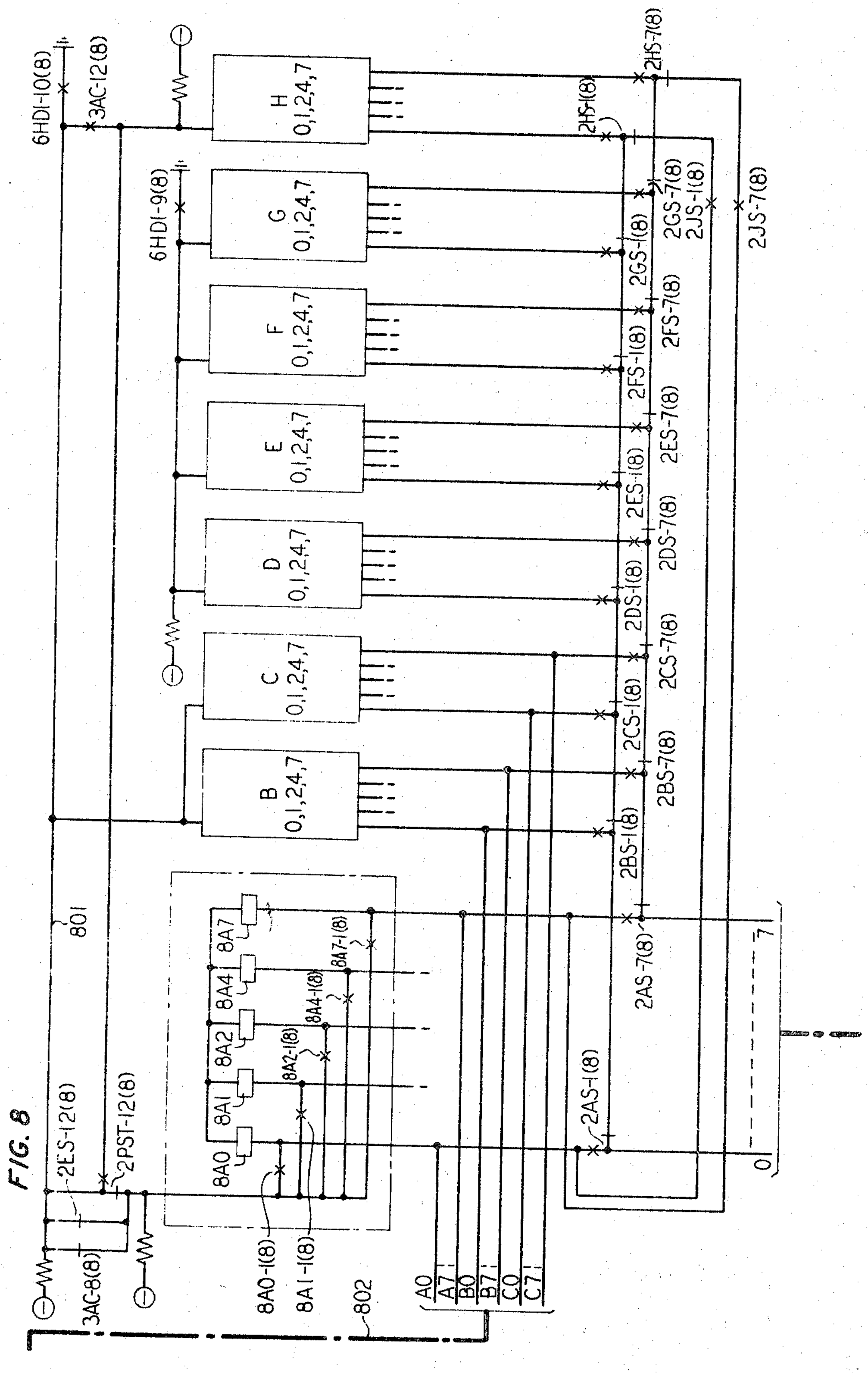
FIG. 8 shows particularly the digit registration circuit.
Figure 9:
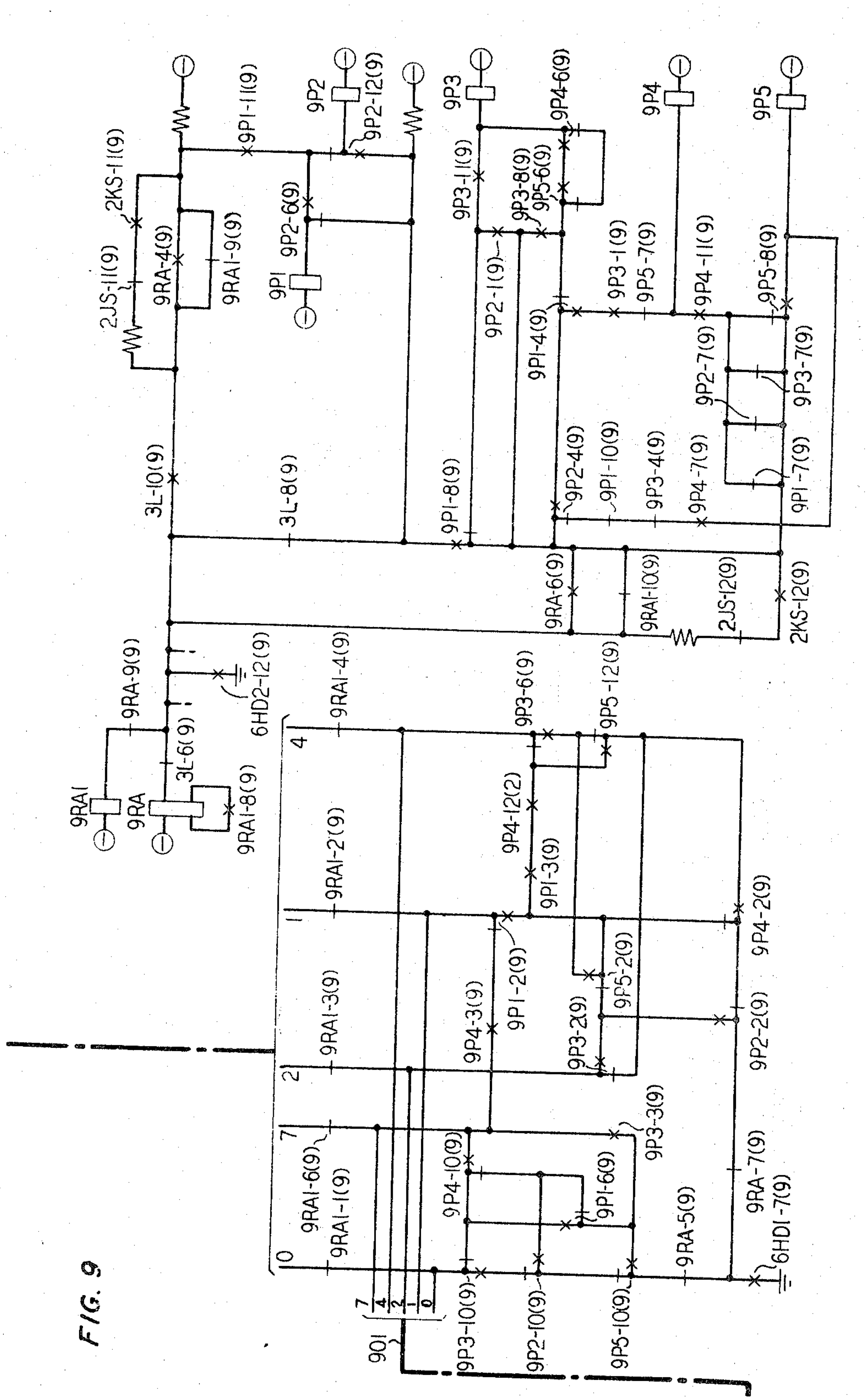
FIG. 9 shows particularly the pulse counting circuit and the matrix of pulse counting relay contacts associated with the digit registration circuit.

The signal received over lead IC from the pretranslator operates relay 3IC of the register; relay 3IC upon operating locks through its make contact 3IC–8(3) and over leads 304 and 203 to the ground at make contact 6HD2–4(2). In order that the register may make the determination referred to in the preceding paragraph the digit timing method of determining the end of dialing is utilized. To this purpose the normal interdigital timing interval is reduced to an interval of between three and five seconds, this reduction being made (1) after the sixth digit, with digits 411 registered in registered units D. E, F (FIG. 8) whereby to determine whether the call is an NXX–411 or NXX–411X call, or (2) after the seventh digit, with other than 411 registered in register units D, E, F, whereby to determine if the call is a 7-digit or a 10-digit call. For purposes of description it will be assumed first that the call being dialed is a NXX–411X call and that the digits 411 have at this point been registered in respective register units D, E and F (FIG. 8).

Relay 5N11 now operates over a path completed through readout contacts of the D, E and F contact groups (FIG. 7) this operate path being traced from battery, winding of relay 5N11, make contact 3IC–10(5), lead 501, closed readout contact 8DO–2(7), break contact 2RCA–3(7), readout contact 8D4–3(7), readout contact 8EO–2(7), break contact 2RCA–5(7), readout contact 8EI–2(7), readout contact 8FO–2(7), break contact 2RCA–7(7), readout contact 8F1–2(7) to ground. Relay 5N11, upon operating, locks to ground through its make contact 5N11–12(5) and over leads 502 and 203.

Operation of relay 5N11 is followed by operations of relay 3TED (time end of dialing) over a path from ground, break contact 4ST1–2(3), make contact 2GS–10(3), make contacts of respective transfer pairs 5N11–4(3) and 2FS–11(3), make contact 3IC–12(3), break contacts 3OC–4(3) and 3AC–6(3), winding of relay 3TED to battery. (Diode 308, included in lead 309, prevents premature operation of relay 3TO by this ground through make contacts of relay 3TED.) Relay 3TED, operated, changes the interdigital interval from its normal value of 16–25 seconds to a critical timing interval of between three to five seconds. This is accomplished by the connection through its make contact 3TED–5(6) of resistor 601 in one of the timing networks of the function timer 600.

Function timer 600 is shown as a general type well known in the art and described, for example, in J. M. Armstrong et al. Patent 3,001,027, Sept. 19, 1961. In general, expiration of a measured time interval is signaled by operation of relay 6TM which operation follows breakdown and conduction through gas tube 603; this breakdown, in turn occurs when the potential built up in capacitor 604 reaches the breakdown characteristic of tube 603. The time interval necessary for accumulation of this potential is determined by the characteristics of the various resistors, as resistors 601, 602, 607, 608, which are included in a timing network through operation of control relays as 3TED and 6SA.

Function timing starts with operation of relay 6DCK whereby the operate path of relay 6TM is connected through the make contact of transfer pair 6DCK–4(6) and over lead 612 to a path controlled by gas tube 603.

SEVENTH DIGIT RECEIVED BEFORE REGISTER TIME-OUT

It will be recalled that it is being assumed in the first instance that the call is an NXX–411X call. Accordingly, an additional digit is to be received after the "411" registration referred to above. Assuming now that this additional digit is received before register time-out and remembering that relay 5N11 has operated, relay 3OC will operate from ground, break contact 4ST1–2(3), make contact 2GS–10(3), make contact of transfer pair 5N11–4(3), break contacts of respective transfer pairs 2FS–11(3) and 3TO-2(3), winding of relay 3OC to battery; relay 3OC, upon operating, locks to ground at make contact 6HD2–4(2) through its make contact 3OC–1(3) and leads 304 and 203. The register now concludes that the complete number NXX–411X has been dialed by operating relay 2RC (registration complete) over a path from battery, winding of relay 2RC, break contact to transfer pair 2RC–6(2), lead 204, break contact of transfer pair 3AC–10(2), make contact 2HS–11(2), make contact of transfer pair 30C–2(2), make contact 9RA1–8(2), lead 202 to ground at make contact 6HD2–4(2). Relay 2RC, operated, locks to this same ground through the make contact of its transfer pair 2RC–6(2).

Relay 30C, operated, releases relay 3TED by interrupting the operate path at break contact 30C–4(3), and relay 3TED, released, restores the timer to its normal timing interval by interrupting at make contact 3TED–5(6) the path by which resistor 601 was included in a timing network of function timer 600.

Relay 2RC, operated as described above, closes a path from ground through break contact 4ST1–2(3) and make contact 2RC–8(3) over tip lead 305; this ground signal initiates a request for attachment of a sender (as sender 107, FIG. 1). When the sender is ready to receive information outpulsed from the register it operates relay 6SA (over a path not shown in detail). The digits as registered on the recapture relays are now outpulsed under control of alternate operations and release of relay 6PG1. The specific ararngement and operation of this portion of the register operations are not particularly pertinent with regard to the present invention and will not be described in detail at this point in order that the disclosure may not be unduly lengthened.

SEVENTH DIGIT DIALED BUT NOT RECEIVED BEFORE REGISTER TIME-OUT

As pointed out above, we are assuming, first, that the call involved is an NXX–411X call and it will be recalled that the critical time interval of 3–5 seconds was effected for a first condition, that is, with 411 registered in fourth, fifth and sixth digit registers.

For purposes of further description, it will be assumed now that the calling customer is late in transmitting the seventh digit and that the digit is not, in fact, received by the register prior to the end of the critical interval and time-out by the register. It is undesirable, of course, that the call be terminated on the basis only of the six digits received. According to the novel arrangement contemplated by my invention, such undesirable termination is prevented and the calling customer is signaled to redial the call.

When relay 6TM operates at the end of the critical timing interval, a path is closed for operating relay 3TO from ground at make contact 6HD1–8(3), resistor 306, make contact 6TM–4(3), lead 309, make contact of transfer pair 3TED–4(3), break contact of transfer pair 3TO–5(3), winding of relay 3TO to battery; relay 3TO operates and locks to this same ground through its make contact 3TO–5(3). Now it will be noted that, with relay 3TO operated, a path is closed through the make contact of its transfer pair 3TO–6(3) for holding the operating winding of the line pulses repeating relay 3L in monitoring engagement with the pulsing lead, ring conductor 307. Accordingly, as the pulses of the "late" digit are received over conductor 307, relay 3L will operate in its normal manner in step with the pulses and will operate the pulse counting relays 9P1–9P5; the first of the counting relays to operate is relay 9P1.

With relays 3TO and 9P1 operated, a path is closed for operating relay 3TRL from ground at make contact 6HD1–8(3), resistor 306, make contacts 3TO–4(3) and 9P1–12(3), winding of relay 3TRL, make contact of transfer pair 3TO–11(3) to battery; relay 3TRL operates and locks to the same ground through its make contact 3TRL–1(3).

Relay 3TRL, operated, functions in its normal manner to prevent termination of the call as registered and to return reorder tone to the calling customer. For example, it may release the link by shunting a winding on the link holding relay whereby to release that relay and may operate a second relay, as relay 20F operated through make contact 3TRL–5(2), operation of which in turn is effective to connect reorder tone from source 205 to the calling customer. Accordingly, through provision of the novel arrangement contemplated, the calling customer is not subjected to an incorrect termination of his call and, further, an indication is furnished to him of the fact that the call has not gone through and that the number should be redialed.

It should be noted that my novel circuit arrangement is such that, in those instances where time-out after the critical timing interval is not involved and relay 3TO does not operate, then relay 3L is under control of relay 2RC in the normal manner. That is, in such instances, when relay 2RC operates indicating registration complete, the line will be open at the break contact of transfer pair 2RC–5(3), (relay 3TO being in released position), whereby operation of relay 3L is prevented even though additional pulses be received over the line. This relationship is desirable since, as pointed out above, the tenth digit is stored in the pulse counting relays 9P1–9P5 rather than being transferred to digit registers as in the instances of the lower-numbered digits. Any additional operations of relay 3L after "registration complete" would be undesirable, therefore, since the preset condition of the 9P1–9P5 relays for registering the tenth digit would be disturbed.

CALL OTHER THAN NXX—411X

It was assumed in the instance described above that the call being dialed was an NXX—411X call and that the digits 411 had been stored in the fourth, fifth and sixth digit registers. For purposes of further description, a second condition will now be assumed, that is, that a 10-digit call is being dialed and that digits other than 411 are registered in the fourth, fifth and sixth digit registers.

In this case, relay 5N11 will not operate since the above-described operate path through the 8D–, 8E– and 8F– recapture relay contacts will not be closed. Relay 3TED will now operate at the end of the seventh digit rather than at the end of the sixth digit as previously described, the operate path being traced from ground, break contact 4ST1–2(3), make contact 2GS–10(3), break contact of transfer pair 5N11–4(3), make contacts 2HS–10(3) and 2PST–10(3), break contacts 30C–4(3) and 3AC–6(3), winding of relay 3TED to battery. If an additional digit is not received during the 3–5 second timing interval relay 3TO operates as previously described.

With relays 2GS and 2HS still operated, relay 30C operates from ground, break contact 4ST1–2(3), make contact 2GS–10(3), break contact of transfer pair 5N11–4(3), make contact 2HS–10(3), break contact 2FS–10(3), make contact of transfer pair 3TO–2(3), winding of relay 30C to battery; relay 30C, operated, locks to the ground on lead 304 through its make contact 30C–1(3). The register then concludes that a 7-digit call has been dialed by adjusting to registration complete condition; the 2RC relay operates over a path from battery, winding of relay 2RC, break contact of transfer pair 2RC–6(2), lead 204, break contact of transfer pair 3AC–10(2), make contact 2HS–11(2), make contact of transfer pair 30C–2(2), make contact 9RA1–8(2), lead 202, make contact 6HD2–4(2) to ground; relay 2RC upon operating locks to this same ground through the make contact of its transfer pair 2RC–6(2).

As pointed out above, it is assumed that a 10-digit call is being dialed and it will first be further assumed that the eighth digit is received after operation of relay 2RC but prior to expiration of the critical timing interval. Relay 2GS releases following receipt of the eighth digit and this, in turn, causes release of relay 3TED by interrupting the operate path at make contact 2GS–10(3). Relay 3TED, released, restores the function timer to its normal timing interval by removing resistor 601 from the timing network at make contact 3TED–5(6).

After the eighth digit has been dialed relay 2JS operates whereby to close an operate path for relay 3AC traced from ground, break contact 4ST1–2(3), make contact 2JS–10(3), break contact 30C–5(3), break contact of transfer pair 3T0–1(3), winding of relay 3AC to battery; relay 3AC, operated, locks to the ground on lead 203 through its make contact 3AC–1(3). With relay 3AC operated, an operate path for relay 2RC will not be closed until the tenth digit has been registered and relay 2KS has operated after which relay 2RC operates from battery, winding of relay 2RC, break contact of transfer pair 2RC–6(2), make contact 2KS–9(2), break contacts of the respective transfer pairs of the intervening steering relays 2HS–2AS, lead 202, break contact 2RCA–11(2), make contacts 9RA1–8(2) and 6HD2–4(2) to ground; relay 2RC operates and locks to this same ground through the make contact of its transfer pair 2RC–6(2).

So long as the eighth digit is received prior to expiration of the critical interval, therefore, the register is set to receive the full ten digits in the normal manner. On the other hand if an additional digit is not received before expiration of the critical interval, due for example to a prolonged pause in the dialing, the register will time-out as above described and the line pulse repeating relay 3L will be held in monitoring contact with ring lead 307. Then as additional pulses are received, relays 3L and 9PI will operate and trouble release relay 3TRL will operate in turn whereby to prevent termination of the call as registered and to transmit a reorder indication to the calling customer.

The novel manner in which the line pulse repeating relay 3L is held in monitoring connecting with the pulsing line in those instances where digit timing is involved and relay 3TO has operated, but remains under control of the registration complete relay in other instances, is a particularly valuable one. The arrangement permits monitoring for late pulses in the early stages of the call, when it is important to detect such occurrences, and yet prevents possible interference with the registered tenth digit at the end of the call in the case of an additional pulse resulting, for example, from an accidental tap of the receiver switch.

It is to be understood that the above-described arrangement is illustrative of the application of the principles of the invention. Numerous other arrangements may be devised by those skilled in the art without departing from the spirit and scope of the invention.

What is claimed is:

1. In an automatic telephone switching system, a line, means for transmitting over said line a series of pulses representing a directory number, a register circuit for receiving and storing said pulses as transmitted over said line, means effective following receipt and storage of a predetermined number of pulses for measuring a predetermined time interval and for causing said register circuit to time-out if no additional pulses are received during said interval, means effective following said time-out action to outpulse the information stored in said register circuit whereby to complete a connection to the indicated directory number, and means effective upon receipt of an additional pulse over said line subsequent to said time-out action for preventing completion of the call to the number as registered in said register circuit.

2. In an automatic telephone switching system the combination defined by claim 1 further characterized in first means operable to receive and store a first predetermined number of pulses under a first condition of digit combinations and positions, second means operable to receive and store a second predetermined number of pulses under a second condition of digit combinations and positions, and means for controlling said measuring means whereby said measuring means is rendered effective in response to the enabling of said first means and said second means.

3. In an automatic telephone switching system, the combination defined by claim 1 further characterized in a pulse repeating relay normally connected in pulse repeating relationship to said line prior to said time-out action and in pulse monitoring relationship following time-out action, and additonal means effective following time-out action for maintaining said relay in pulse repeating relationship to said line.

4. In an automatic telephone switching system the combination defined by claim 3 further characterized in means also effective upon receipt of an additional pulse over said line subsequent to said time-out action for transmitting a re-order signal to said line.

5. In an automatic telephone switching system, the combination defined by claim 4 further characterized in a second relay controlling said re-order signal transmitting means and means effective following pulse repeating action by said first-mentioned relay subsequent to time.out action for operating said second relay.

6. In an automatic telephone switching system, the combination defined by claim 5 further characterized in the provision of a third relay and a fourth relay, and a transfer contact pair of each of said last two mentioned relays so connected in said line that said pulse repeating relay is connected in pulse repeating relationship with said line when both said third relay and said fourth relay are in released position, is connected in pulse monitoring relationship with said line when said third relay is operated and said fourth relay is released and is also connected in pulse repeating relationship with said line when said fourth relay is in operated position regardless of the operated or released position of said third relay.

7. In an automatic telephone switching system, the combination defined by claim 6 further characterized in the provision of a plurality of pulse counting relays controlled by said pulse repeating relay.

8. In an automatic telephone switching system, the combination defined by claim 7 further characterized in that said means for operating said second relay includes a make contact of said fourth relay and a make contact of one of said pulse counting relays.

9. In a telephone system, means for registering dialed digits, timing means for detecting a last dialed digit, means responsive to certain digit combinations and digit positions for reducing the timing interval of said time-out means, and means responsive to another dialed digit after operation of said time-out means with said reduced timing interval for preventing completion of the call on the basis of the priorly registered dialed digits.

10. In a telephone system the combination of claim 9 wherein said registering means includes a pulse repeating relay directly responsive to dialed pulses, a second relay responsive to operation of said time-out means and having contacts for preventing further dialed pulses operating said pulse repeating relay, and said means responsive to another dialed digit including contacts of a third relay provding a shunt path around said contacts of said second relay.

References Cited

UNITED STATES PATENTS

| | | | |
|---|---|---|---|
| 2,594,014 | 4/1952 | Haines et al. | 179—18 |
| 3,131,262 | 4/1964 | Avery. | |

KATHLEEN H. CLAFFY, Primary Examiner

T. W. BROWN, Assistant Examiner